(12) United States Patent
Jha et al.

(10) Patent No.: US 11,847,038 B1
(45) Date of Patent: Dec. 19, 2023

(54) SYSTEM AND METHOD FOR AUTOMATICALLY RECOMMENDING LOGS FOR LOW-COST TIER STORAGE

(71) Applicant: VMWARE, INC., Palo Alto, CA (US)

(72) Inventors: Chandrashekhar Jha, Bangalore (IN); Siddartha Laxman Karibhimanvar, Bangalore (IN); Rohan Kumar Jain, Bangalore (IN); Shivam Satija, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/950,163

(22) Filed: Sep. 22, 2022

(30) Foreign Application Priority Data

Jul. 15, 2022 (IN) .............................. 202241040593

(51) Int. Cl.
  *G06F 11/30* (2006.01)
  *G06F 16/35* (2019.01)

(52) U.S. Cl.
  CPC ...... *G06F 11/3079* (2013.01); *G06F 11/3075* (2013.01); *G06F 16/358* (2019.01); *G06F 2201/81* (2013.01)

(58) Field of Classification Search
  CPC ............. G06F 11/3079; G06F 11/3075; G06F 16/358; G06F 2201/81; G06F 17/40; G06F 3/0647; G06F 3/0685
  See application file for complete search history.

(56) References Cited

U.S. PATENT DOCUMENTS

| 10,887,157 | B1 * | 1/2021 | Fletcher | H04L 41/0622 |
| 2013/0290787 | A1 * | 10/2013 | Chen | H04L 43/0817 714/37 |
| 2022/0113938 | A1 * | 4/2022 | Jha | G06F 11/076 |

FOREIGN PATENT DOCUMENTS

| CN | 107104840 | A | * | 8/2017 |
| CN | 111625560 | A | * | 9/2020 |
| CN | 112131075 | A | * | 12/2020 |
| CN | 114020712 | A | * | 2/2022 |
| CN | 114157456 | A | * | 3/2022 |
| CN | 114385463 | A | * | 4/2022 |
| CN | 115018551 | A | * | 9/2022 |
| EP | 2806386 | A1 | * | 11/2014 |
| JP | 2005332345 | A | * | 12/2005 |
| JP | 2022007859 | A | * | 1/2022 |
| WO | WO-2015049742 | A1 | * | 4/2015 |

\* cited by examiner

*Primary Examiner* — Shean Tokuta
(74) *Attorney, Agent, or Firm* — LOZA & LOZA, LLP

(57) ABSTRACT

A system and method for managing logs from computing environments uses a rate change in a rate of occurrence of same event type logs from a base time window to a current time window for each of the event types to identify candidate event types for a particular tier log storage. The rate changes of the event types are checked against a threshold rate change range to identify the candidate event types. In response to selection of some of the candidate event types, the logs in the selected candidate event types are transferred to the particular tier log storage.

20 Claims, 5 Drawing Sheets

SYSTEM AND METHOD FOR AUTOMATICALLY RECOMMENDING LOGS FOR LOW-COST TIER STORAGE

RELATED APPLICATIONS

Benefit is claimed under 35 U.S.C. 119(a)-(d) to Foreign Application Serial No. 202241040593 filed in India entitled "SYSTEM AND METHOD FOR AUTOMATICALLY RECOMMENDING LOGS FOR LOW-COST TIER STORAGE", on Jul. 15, 2022, by VMware, Inc., which is herein incorporated in its entirety by reference for all purposes.

BACKGROUND

Logs are set of defined events that are outcomes of system applications, which help in analyzing the overall system behavior. Logs can contain information, errors, warnings, texts, etc. that can be used for such analysis. The contents of the logs are defined by developers of applications within a system. Due to their usefulness, many log analytic services have gained market attraction in recent years. These log analytic services provide many features with respect to the logs generated in their system, such as querying, alerting, indexing, storage, analytics etc.

Due to their cost, some log analytic services provide a low-cost log storage service for certain logs, which mainly provides storage of the logs without advanced features, such as analytics and alerting. In order to use this low-cost service, the logs for this service need to be identified and separated from other logs that may need the advanced features of the log analytics service. However, manually extracting the logs for the low-cost log storage service may be challenging due to the volume of logs that must be examined for selection.

SUMMARY

A system and method for managing logs from computing environments uses a rate change in a rate of occurrence of same event type logs from a base time window to a current time window for each of the event types to identify candidate event types for a particular tier log storage. The rate changes of the event types are checked against a threshold rate change range to identify the candidate event types. In response to selection of some of the candidate event types, the logs in the selected candidate event types are transferred to the particular tier log storage.

A computer-implemented method for managing logs from computing environments in accordance with an embodiment of the invention comprises receiving logs from a computing environment, grouping the logs into event types using a log classification algorithm, computing a rate change in a rate of occurrence of same event type logs from a base time window to a current time window for each of the event types, checking the rate changes of the event types against a threshold rate change range to identify candidate event types for a particular tier log storage, sending the candidate event types for selection for the particular tier log storage, and in response to selection of some of the candidate event types, transferring the logs in the candidate event types that are selected to the particular tier log storage. In some embodiments, the steps of this method are performed when program instructions contained in a non-transitory computer-readable storage medium are executed by one or more processors.

A system in accordance with an embodiment of the invention comprises memory, and at least one processor configured to receive logs from a computing environment, group the logs into event types using a log classification algorithm, compute a rate change in a rate of occurrence of same event type logs from a base time window to a current time window for each of the event types, check the rate changes of the event types against a threshold rate change range to identify candidate event types for a particular tier log storage, send the candidate event types for selection for the particular tier log storage, and in response to selection of some of the candidate event types, transfer the logs in the candidate event types that are selected to the particular tier log storage.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
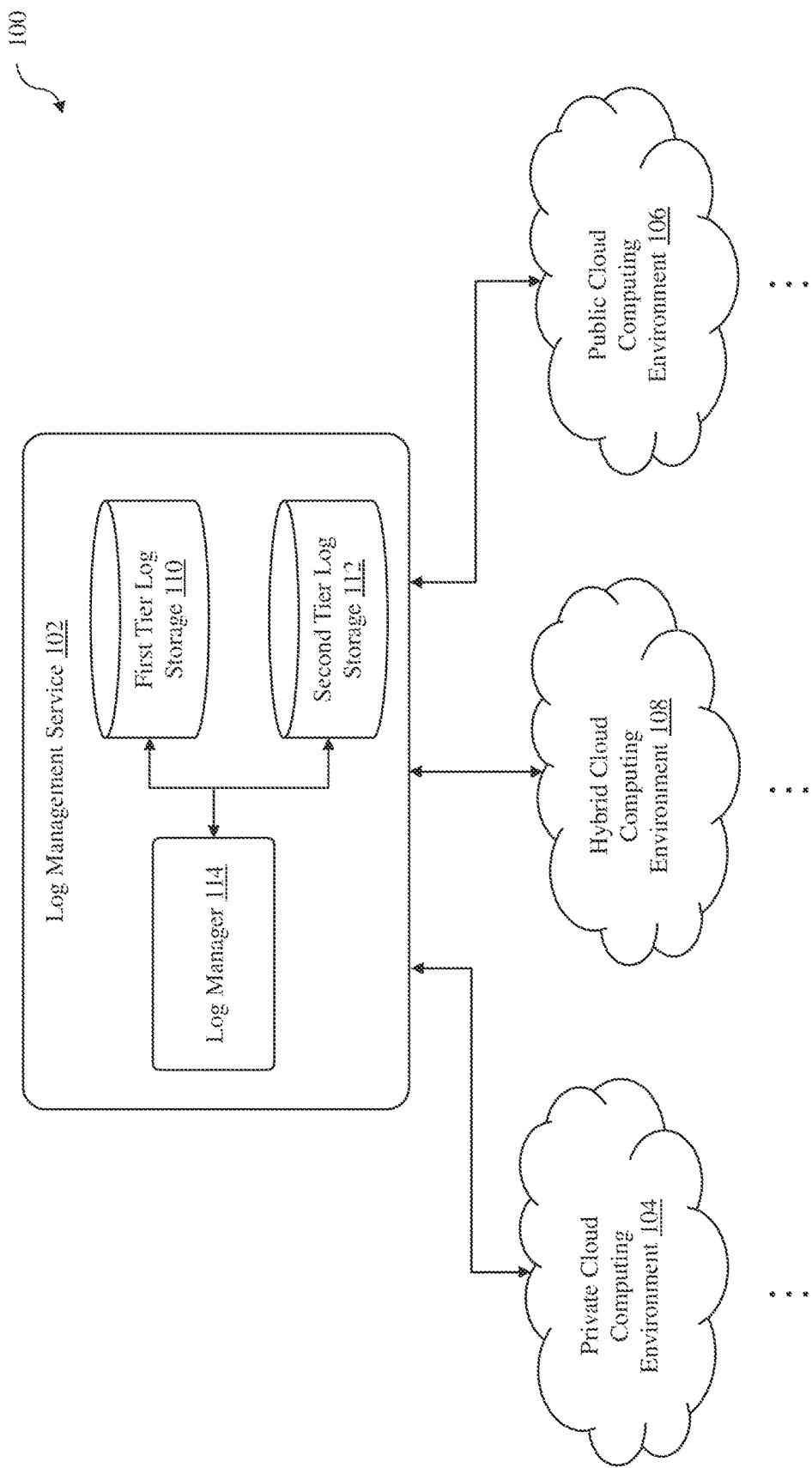
FIG. 1 is a diagram of a distributed system in accordance with an embodiment of the invention.

Turning now to FIG. 1, a diagram of a distributed system 100 in accordance with an embodiment of the invention is illustrated. As shown in FIG. 1, the distributed system 100 includes a log management service 102, which may provide log management solution to one or more computing environments, such as private cloud computing environments 104, public cloud computing environments 106 and hybrid cloud computing environments 108, which generate logs from various applications running on the respective computing environments. These logs store data about events that occur in application during operation of the applications, which can be used to analyze various aspects of the applications and the overall system behavior. The data contained in the logs may include information, errors, warnings and texts regarding events and any other data related to the events.

The private cloud computing environments 104 may include on-premises (on-prem) data centers. The public cloud computing environments 106 may include computing environments in a public cloud. The hybrid cloud computing environments 108 are computing environments that include both private and cloud computing environments. These different cloud computing environments can be viewed as being customers of the log management service 102, which may be running in a public cloud or other computing environments.

As shown in FIG. 1, the log management service 102 includes a first tier log storage 110 and a second tier log storage 112. The first tier log storage 110 may be used for a first type service, which provides certain features, while the second tier log storage 112 may be used for a second type service, which provides fewer features. In some embodiments, the first type service may be a high-cost tier log management service and the second type service may be a low-cost tier log management service. The logs from the various computing environments are stored in either of these storages, depending on the desired tier service for those logs.

The log management service 102 further includes a log manager 114, which manages the logs stored in the first and second tier log storages 110 and 112. The log manager 114 may provide various log management features, such as analytics, to users, e.g., administrators of the computing environments 104-108, depending on which log storage the logs are stored. In addition, as explained in more detail below, when requested from any of the computing environments 104-108, the log manager 114 makes recommendations for logs that are suitable to be placed in the second tier log storage 112, rather than the first tier log storage 110. Thus, the log manager 114 can assist in placing logs in the second tier log storage 112 to provide significant cost savings for the computing environments 104-106.

Figure 2:
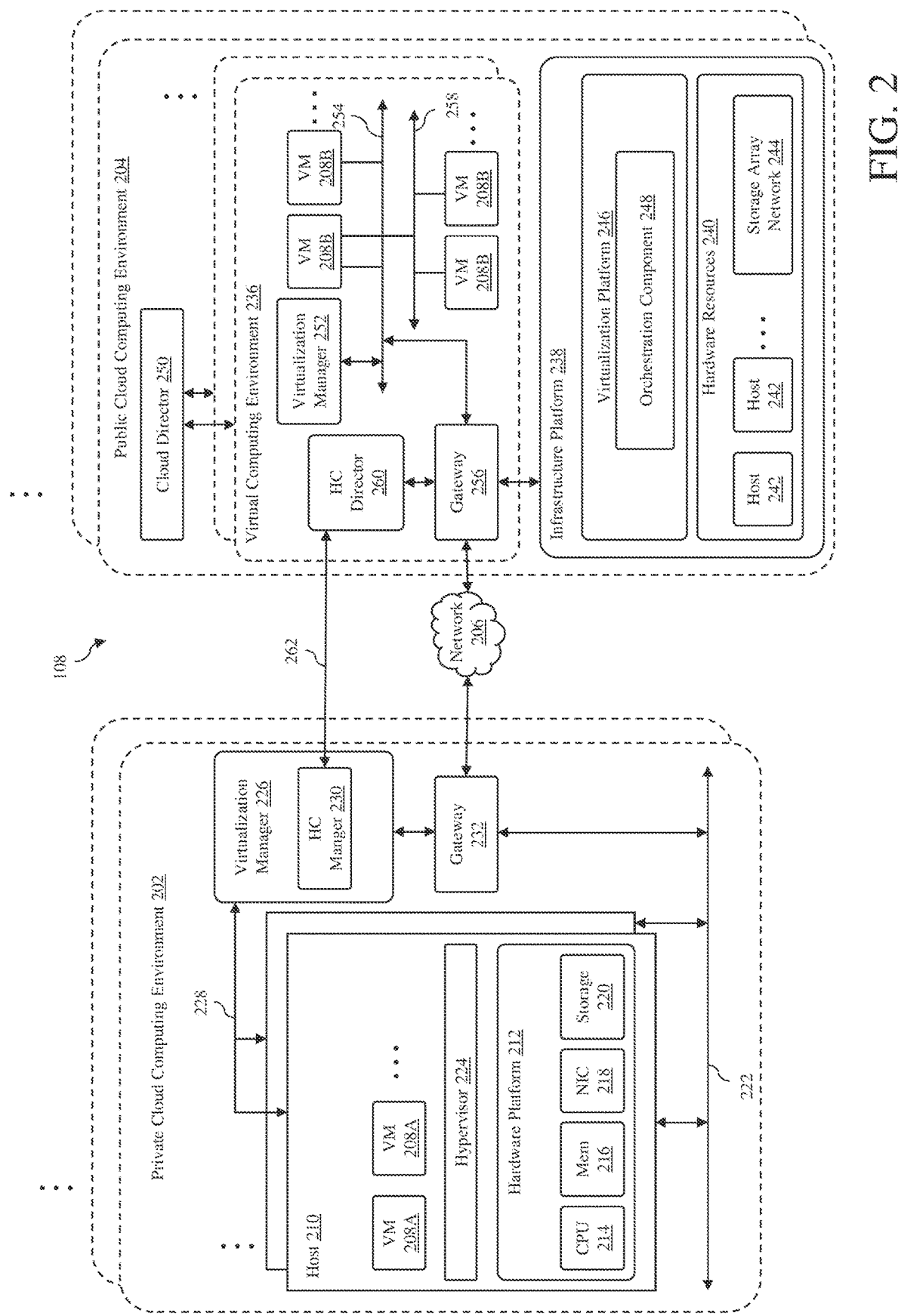
FIG. 2 is a diagram of an example of a hybrid cloud computing environment in the distributed system shown in FIG. 1.

Turning now to FIG. 2, an example of the hybrid cloud computing environment 108 that includes one or more private cloud computing environments 202 and one or more public cloud computing environments 204 in accordance with an embodiment of the invention is shown. The private and public cloud computing environments 202 and 204 are examples of the private and public cloud computing environments 104 and 106 shown in FIG. 1.

In an embodiment, one or more of the private cloud computing environments 202 may be controlled and administrated by a particular enterprise or business organization, while one or more of the public cloud computing environments 204 may be operated by a cloud computing service provider and exposed as a service available to account holders, such as the particular enterprise in addition to other enterprises. In some embodiments, each private cloud computing environment 202 may be a private or on-premise data center. The private and public cloud computing environments 202 and 204 are connected to each other via a network 206.

The private and public cloud computing environments 202 and 204 of the hybrid cloud computing environment 108 include computing and/or storage infrastructures to support a number of virtual computing instances 208A and 208B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

As shown in FIG. 2, each private cloud computing environment 202 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218 and storage 220. The processor 214 is configured to execute instructions, for example, executable instructions that perform one or more operations described herein and may be stored in the memory 216 and the storage 220. The memory 216 is volatile memory used for retrieving programs and processing data. The memory 216 may include, for example, one or more random access memory (RAM) modules. The network interface 218 enables the host 210 to communicate with another device via a communication medium, such as a network 222 within the private cloud computing environment. The network interface 218 may be one or more network adapters, also referred to as a Network Interface Card (NIC). The storage 220 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage 220 is used to store information, such as executable instructions, cryptographic keys, virtual disks, configurations and other data, which can be retrieved by the host.

Each host 210 may be configured to provide a virtualization layer that abstracts processor, memory, storage and networking resources of the hardware platform 212 into the virtual computing instances, e.g., the virtual machines 208A, that run concurrently on the same host. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support software containers.

Each private cloud computing environment 202 includes a virtualization manager 226 that communicates with the hosts 210 via a management network 228. In an embodiment, the virtualization manager 226 is a computer program that resides and executes in a computer system, such as one of the hosts 210, or in a virtual computing instance, such as one of the virtual machines 208A running on the hosts. One example of the virtualization manager 226 is the VMware vCenter Server® product made available from VMware, Inc. The virtualization manager 226 is configured to carry out administrative tasks for the private cloud computing environment 202, including managing the hosts, managing the virtual machines running within each host, provisioning virtual machines, migrating virtual machines from one host to another host, and load balancing between the hosts.

In one embodiment, the virtualization manager 226 includes a hybrid cloud (HC) manager 230 configured to manage and integrate computing resources provided by the private cloud computing environment 202 with computing resources provided by one or more of the public cloud computing environments 204 to form a unified "hybrid" computing platform. The hybrid cloud manager is configured to deploy virtual computing instances, e.g., virtual machines 208A, in the private cloud computing environment, transfer virtual machines from the private cloud computing environment to one or more of the public cloud computing environments, and perform other "cross-cloud" administrative tasks. In one implementation, the hybrid cloud manager 230 is a module or plug-in to the virtualization manager 226, although other implementations may be used, such as a separate computer program executing in any computer system or running in a virtual machine in one of the hosts. One example of the hybrid cloud manager 230 is the VMware® HCX™ product made available from VMware, Inc.

In one embodiment, the hybrid cloud manager 230 is configured to control network traffic into the network 206 via a gateway device 232, which may be implemented as a virtual appliance. The gateway device 232 is configured to provide the virtual machines 208A and other devices in the private cloud computing environment 202 with connectivity to external devices via the network 206. The gateway device 232 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 206.

Each public cloud computing environment 204 is configured to dynamically provide an enterprise (or users of an enterprise) with one or more virtual computing environments 236 in which an administrator of the enterprise may provision virtual computing instances, e.g., the virtual machines 208B, and install and execute various applications in the virtual computing instances. Each public cloud computing environment includes an infrastructure platform 238 upon which the virtual computing environments can be executed. In the particular embodiment of FIG. 2, the infrastructure platform 238 includes hardware resources 240 having computing resources (e.g., hosts 242), storage resources (e.g., one or more storage array systems, such as a storage area network (SAN) 244), and networking resources (not illustrated), and a virtualization platform 246, which is programmed and/or configured to provide the virtual computing environments 236 that support the virtual machines 208B across the hosts 242. The virtualization platform may be implemented using one or more software programs that reside and execute in one or more computer systems, such as the hosts 242, or in one or more virtual computing instances, such as the virtual machines 208B, running on the hosts.

In one embodiment, the virtualization platform 246 includes an orchestration component 248 that provides infrastructure resources to the virtual computing environments 236 responsive to provisioning requests. The orchestration component may instantiate virtual machines according to a requested template that defines one or more virtual machines having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environments 202, the virtualization platform may be implemented by running on the hosts 242 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 204.

In one embodiment, each public cloud computing environment 204 may include a cloud director 250 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 248 to instantiate the requested virtual computing instances (e.g., the virtual machines 208B). One example of the cloud director is the VMware vCloud Director® product from VMware, Inc. The public cloud computing environment 204 may be VMware cloud (VMC) on Amazon Web Services (AWS).

In one embodiment, at least some of the virtual computing environments 236 may be configured as virtual data centers.

Each virtual computing environment includes one or more virtual computing instances, such as the virtual machines 208B, and one or more virtualization managers 252. The virtualization managers 252 may be similar to the virtualization manager 226 in the private cloud computing environments 202. One example of the virtualization manager 252 is the VMware vCenter Server® product made available from VMware, Inc. Each virtual computing environment may further include one or more virtual networks 254 used to communicate between the virtual machines 208B running in that environment and managed by at least one networking gateway device 256, as well as one or more isolated internal networks 258 not connected to the gateway device 256. The gateway device 256, which may be a virtual appliance, is configured to provide the virtual machines 208B and other components in the virtual computing environment 236 with connectivity to external devices, such as components in the private cloud computing environments 202 via the network 206. The gateway device 256 operates in a similar manner as the gateway device 232 in the private cloud computing environments.

In one embodiment, each virtual computing environments 236 includes a hybrid cloud (HC) director 260 configured to communicate with the corresponding hybrid cloud manager 230 in at least one of the private cloud computing environments 202 to enable a common virtualized computing platform between the private and public cloud computing environments. The hybrid cloud director may communicate with the hybrid cloud manager using Internet-based traffic via a VPN tunnel established between the gateway devices 232 and 256, or alternatively, using a direct connection 262. The hybrid cloud director and the corresponding hybrid cloud manager facilitate cross-cloud migration of virtual computing instances, such as virtual machines 208A and 208B, between the private and public computing environments. This cross-cloud migration may include both "cold migration" in which the virtual machine is powered off during migration, as well as "hot migration" in which the virtual machine is powered on during migration. As an example, the hybrid cloud director 260 may be a component of the HCX-Cloud product and the hybrid cloud manager 230 may be a component of the HCX-Enterprise product, which are provided by VMware, Inc.

Various components in the hybrid cloud computing environment 108 may generate logs. As an example, in each private cloud computing environment 202, the hosts 210, the virtual machines 208A, the virtualization manager 226, the HC manager 230 and the gateway device 232 may generate logs. In each public cloud computing environment 204, the hosts 242, the virtual machines 208B, the virtualization manager 252, the HC director 260, the cloud director 250 and the gateway device 256 may generate logs. In order to manage these logs, the hybrid cloud computing environment 108 may use the log management service 102 for storage and other advanced features, such as log analytics.

Conventional log analytics products or services typically offer a single cost tier service for ingestion and storage for users or customers, which will be referred to herein as the high-cost tier service. This will allow the users to store their logs in a queryable format. These users are typically billed on the amount of log data, e.g., gigabytes (GBs), ingested. In addition, all other functionalities of the product are available for their use on the whole dataset. i.e., search/analytics can be performed on the dataset as many times as possible without incurring any additional cost. This cost structure treats users who use the product every day and the users who use the product once in a while the same.

However, some users might only be interested in the storage feature of a product, whereas other users might be interested in the analytics. Unfortunately, the cost is going to be the same for both type of users with the conventional log analytics products. Though this cost fee structure works fairly well for users with smaller workload, users who are expected to push terabytes (TBs) of logs to these products might expect sophisticated log handling behavior to help them save cost. Thus, some log analytics products offer a low-cost service, which will be referred to herein as the "Low Cost SKU" service, which is a low-cost tier service for ingestion and storage for users that are billed based on GB ingested and query usage. As an example, there are logs generated every time any particular API gets triggered or when certain job schedulers are executed, which are the same logs generated time. Thus, there is no use to put these logs to high-cost tier service since these logs do not provide any insight with respect to log analytics.

The problem of using convention log analytics products is further described using an example of a user who is ingesting 10,000 GB of log data per month on high-cost tier service at a cost of $2.39 for each 1 GB of log data. Thus, the cost for 10,000 GB of log data per month at $2.39 for each 1 GB of log data will be 10,000×$2.39, i.e., $23,900 per month. And from this 10,000 GB of data, the user might use only 2,000 GB of log data per month on average for advanced purposes, such as querying, alerting, analytics, indexing etc., which costs 2,000×$2.39, i.e., $4,780 per month. In this case, the user might say that this log analytics product is not cost optimized since the user is charged the same for every set of logs, even when the user is not querying on 8,000 GB (i.e., 10,000 GB minus 2,000 GB) of log data per month, which cost 8,000×$2.39, i.e., $19,120, per month.

Currently, the solution to this problem offered by some log analytics product is to ask the users to manually extract logs that the users believe will not provide any insight using querying, analytics, etc., and, thus, are of no use putting the logs in the high-cost tier service, and to put those logs in the Low Cost SKU service for debugging and compliance purposes. With this solution, only the logs extracted and placed in the Low Cost SKU service will be billed to the users according to the cost for the Low Cost SKU service, which is much less than the high-cost tier service. Thus, this solution helps users to optimize cost for log management operations.

An important question that arises is at what percentage extent a user would be able to save using the Low Cost SKU solution? In the above example, let's assume that the user extracts 6,000 GB of logs per month from those 8,000 GB of data to place in the Low Cost SKU service, which has a cost structure of 1 GB of data per month at $0.0649. Then, the cost for those extracted 6,000 GB of logs per month will be 6,000×$0.0649, i.e., $389.40 per month. This also means that the remaining 4,000 GB of logs from the total 10,000 GB of logs are still in the high-cost tier service, which would be 4,000×$2.39, i.e., $9,560 per month at the high-cost tier of 1 GB of data per month at $2.39. Thus, the total cost to the user for 10,000 GB of logs per month after putting 6,000 GB of logs per month in the Low Cost SKU category is the cost of 4,000 GB of logs per month in the high-cost tier plus the cost of 6,000 GB of logs per month in the Low Cost SKU tier is $389.40+$9.560, i.e., $9,949,4. Therefore, the percentage change in cost after putting these extracted logs to the Low Cost SKU service is:

$$\frac{TC_{before} - TC_{after}}{TC_{before}} * 100 = \frac{23900 - 9949.4}{23900} * 100 = 58.4\%,$$

where $TC_{before}$ is the total cost before using the Low Cost SKU service and $TC_{after}$ is the total cost after using the Low Cost SKU service.

However, due to the challenges of manually searching and extracting logs for the Low Cost SKU service may prevent some users from using the Low Cost SKU service. The log management service 102 in accordance with embodiments of the invention provides a much better solution. As described in detail below, the log management service 102 operates to recommend a list of logs that may be placed in the Low Cost SKU service, i.e., the second tier log storage 112, without the need for users to manually search and extract suitable logs from a significantly large set of logs. The recommended list of logs depends on the interests of the users, and thus, provide customized log lists for different users. With the log management service 102, users will just have to check whether they want to put the recommended logs in the Low Cost SKU service provided by the log management service.

In an embodiment, the log manager 114 of log management service 102 is initiated when a user requests a recommended list of logs that may be extracted from the high-cost tier service, i.e., the first tier log storage 110, and moved to the Low Cost SKU service, i.e., the second tier log storage 112. In response to the request, two timeframes are created based on the current time of the system with a width of twelve (12) hours as the current time window and the base time window. The current time window's start time will be the time six (6) hours before the system's current time and its end time will be equal to the system's current time, whereas the base time window's start time will be six (6) hours before the current time window's start time and its end time will be equal to current window's start time. Thus, the base time window precedes the current time window. As an example, if the current time of the system is 8:00 PM, then the current time window's start time will be six (6) hours before 8:00 PM (system's current time), i.e., 2:00 PM and the current time window's end time will be the same as the system's current time, i.e., 18:00 PM. Thus, the current time window will be from 2:00 PM to 8:00 PM. The base time window's start time will be six (6) hours before 2:00 PM (current time window's start time), i.e., 8:00 AM and the base time window's end time will be the same as the current time window's start time, i.e., 2:00 PM. Thus, the base time window will be from 8:00 AM to 2:00 PM IST. In other embodiments, different base and current time windows may be utilized by the log manager 114.

Figure 3:
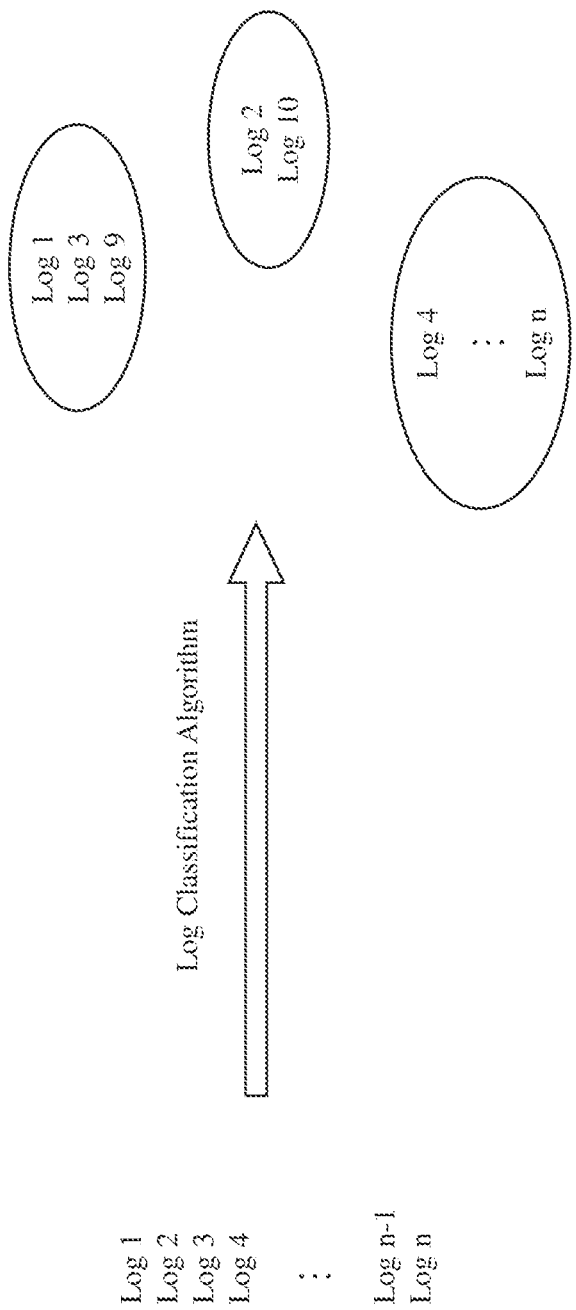
FIG. 3 illustrates using a log classification algorithm by a log manager to group similar logs into an event type cluster in accordance with an embodiment of the invention.

Using a log classification algorithm, the log manager 114 groups similar logs into a cluster and give a unique value to every cluster named as event type. This is illustrated in FIG. 3, which shows logs 1 . . . n being used as input to a log classification algorithm. The input logs 1 . . . n are then classified by grouping similar logs together to output a number of event types 1 . . . n. In the illustrated example, logs 1, 3 and 9 are grouped into the event type 1, and logs 2 and 10 are grouped into the event type 2, and logs 4 . . . n are grouped into the event type n. The log classification algorithm can be any known log classification algorithm, which groups similar logs into different clusters or event types.

Based on the output of the log classification algorithm and the different time frames, the percentage change in the rate of occurrence for every event type from the base time window to the current time window is computed by the log manager 114. As described in more detail below, the event types with low percentage changes would be recommended to be moved to the Low Cost SKU service.

As an example, let's consider one hundred (100) input logs that have been grouped into the same event type named "ABC" by the log manager 114 using the log classification algorithm. Now if this ABC event type logs occurred one hundred (100) times in the current time window, the rate of occurrence of this event type logs in the current time window is one hundred (100) times in six (6) hours (window width), i.e., 0.277 times in a minute. If the ABC event type logs occurred ninety-eight (98) times in the base time window, the rate of occurrence of this event type logs in the base time window will be ninety-eight (98) times in six (6) hours (window width), i.e., 0.272 times in a minute.

Therefore, the percentage rate change for the ABC event type occurrence from the base time window to the current time window is:

$$\frac{OR_{event\ type\ in\ base\ window} - OR_{event\ type\ in\ current\ window}}{OR_{event\ type\ in\ base\ window}} * 100 = \frac{0.272 - 0.277}{0.272} * 100 = -1.83\%,$$

where $OR_{event\ type\ in\ base\ window}$ is the occurrence rate of event type logs in the base time window and $OR_{event\ type\ in\ base\ window}$ is the occurrence rate of event type logs in the current time window.

Using this approach, the percentage change in rate of occurrence for each event type logs is computed by the log manager 114. These percentage changes in the rates of occurrence for different event type logs fall under the following different rate changes:
 (1) Type of events or logs that were not present in the base time period or window but present in the current time period or window (+100%)
 (2) Type of events that are increasing at a faster rate in the current time period compared to the base time period (+15% to +99.99%)
 (3) Type of events that are increasing at a little slower rate than the previous one in the current time period compared to the base time period (+0.01% to +15%)
 (4) Type of events that are constant in the current time period compared to the base time period (0%)
 (5) Types of events that are decreasing at a slower rate in the current time period compared to the base time period (−0.01% To −15%)
 (6) Type of events that are decreasing at a faster rate in the current time period compared to the base time period (−15% To −99.99%)
 (7) Type of events that are not coming anymore in the current time period compared to the base time period (−100%)

Thus, the event types with occurrence rate change percentages between −5% to +5% can be considered to be almost constant in the current time period compared to the base time period. These events or logs should be moved to the Low Cost SKU service because these are most likely to be logs used for compliance or produced for debugging purposes, which are generated every time, for example, when certain APIs are triggered or when certain job schedulers on applications run.

Based on these observations, two types of percentage rate change threshold ranges are maintained by the log manager 114. The first type is the system's global threshold range, which by default is −5% to +5%, but could be other values. The second type is the user's local threshold range, which is the user dedicated threshold range. Every user has its own local threshold range for its computing environment. Initially, when a user first uses the log management service 102, the user's local threshold range is set with the same range as the system's global threshold range, which can vary over time.

Based on the computed percentage rate change in occurrence rate for each event type, all the event type clusters between the customer's local threshold range, which is initially set to the range of −5% to +5%, for example, are sent to a user interface (UI) of the log management service 102 by the log manager 114. In addition, for each event type cluster sent, a representative log from that event type cluster is also sent to the UI. Thus, all the logs that may be extracted out and brought to the second tier log storage 112 for the Low Cost SKU service are presented to the user, which can then be selected by the user to be placed in the second tier log storage. When the logs are selected by the user, every log similar to those selected logs are moved to the second tier log storage 112. That is, the logs in the event type clusters corresponding to the user-selected representative logs are placed in the second tier log storage 112 by the log manager 114, which completes the processing of the request by the log management service 102.

Thus, requests from users of different computing environments are processed, which results in suitable logs being handled by the Low Cost SKU service. However, there may be instances when there are an exceedingly large number of event types which have a percentage rate change within the local threshold range, which may overwhelm the user. Thus, in an embodiment, a background process is initiated by the log manager 114 to reduce or shorten the users' local threshold ranges based on what logs users selected to be moved to the Low Cost SKU service. By reducing the width of a local threshold range, the criteria to filter out event types to be sent to the user for Low Cost SKU selection is reduced, which equates to fewer event types being sent to the user for the Low Cost SKU selection.

This threshold range management process is a feedback loop based on user selections of the recommended event types for the Low Cost SKU service. In an embodiment, if the percentage of user selections from the recommended event types is less than 60% or another threshold percentage value at a boundary value of the local threshold range, then the absolute value of that boundary value is reduced so that the threshold range is shortened. Thus, if the boundary value with less than 60% user selection is a positive value, then the boundary value will be a decreased value, e.g., a boundary value of five percent (5%) will be lowered to four percent (4%). If the boundary value with less than 60% user selection is a negative value, then the boundary value will be an increased value, e.g., a boundary value of negative five percent (−5%) will be increased to negative four percent (−4%).

As an example, let's assumes that the local threshold range for a user is set between −5% to +5%. Let's also assume that the log manager 114 recommended twenty (20) logs (each representing a distinct event type) out of which ten (10) logs have a rate change percentage of +5% and ten (10) logs have a rate change percentage of +4%. If only ten (10) logs out of twenty (20) are selected by the user, where five (5) user-selected logs have +5% as a rate change percentage and five (5) user-selected logs have +4% as a rate change percentage. This means the user selected only half of the logs for both rate change percentages, i.e., 50% from what the log manager 114 recommended. With this user's feedback, each of the two boundary values, i.e., −5% and +5%, of the local threshold range is checked by the log manager 114 to determine the acceptance rate of logs is more than 60% or not. In this example, there are no logs for −5%, but there are ten (10) logs for +5% with customer feedback of an acceptance rate of 50% (i.e., five (5) selected logs out of ten (10) recommended logs), which is less than 60%. This indicates that the user is not that interested in +5% rate event types. Thus, the local threshold range boundary value of +5% is changed to +4% by the log manager 114. As a result, the new local threshold for the user is now −5% to −4%, which is a shorter range than the original range. This process is repeated for every request in order to continue to provide the optimal number of event types for the user to make the Low Cost SKU selection. In this description, an acceptance threshold value of 60% was used. However, any appropriate percentage value may be used as the acceptance threshold value, e.g., 55%.

In an embodiment, the acceptance rate may also be used to lengthen the local threshold rate using another acceptance threshold value, e.g., 90%. In this embodiment, if the percentage of user selections from the recommended event types is greater than 90% or another threshold percentage value at a boundary value of the local threshold range, then the absolute value of that boundary value is increased so that the threshold range is lengthened. Thus, if the boundary value with greater than 90% user selection is a positive value, then the boundary value will be an increased value, e.g., a boundary value of four percent (4%) will be raised to five percent (5%). If the boundary value with greater than 90% user selection is a negative value, then the boundary value will be a decreased value, e.g., a boundary value of negative four percent (−4%) will be decreased to negative five percent (−5%).

In an embodiment, based on the latest local threshold ranges from the users of different computing environments, the system's global threshold range may be updated by the log manager 114 every predefined period, e.g., every week. The modified system's global threshold range is then used by newly onboarded computing environments until the system's global threshold range is further updated.

Figure 4:
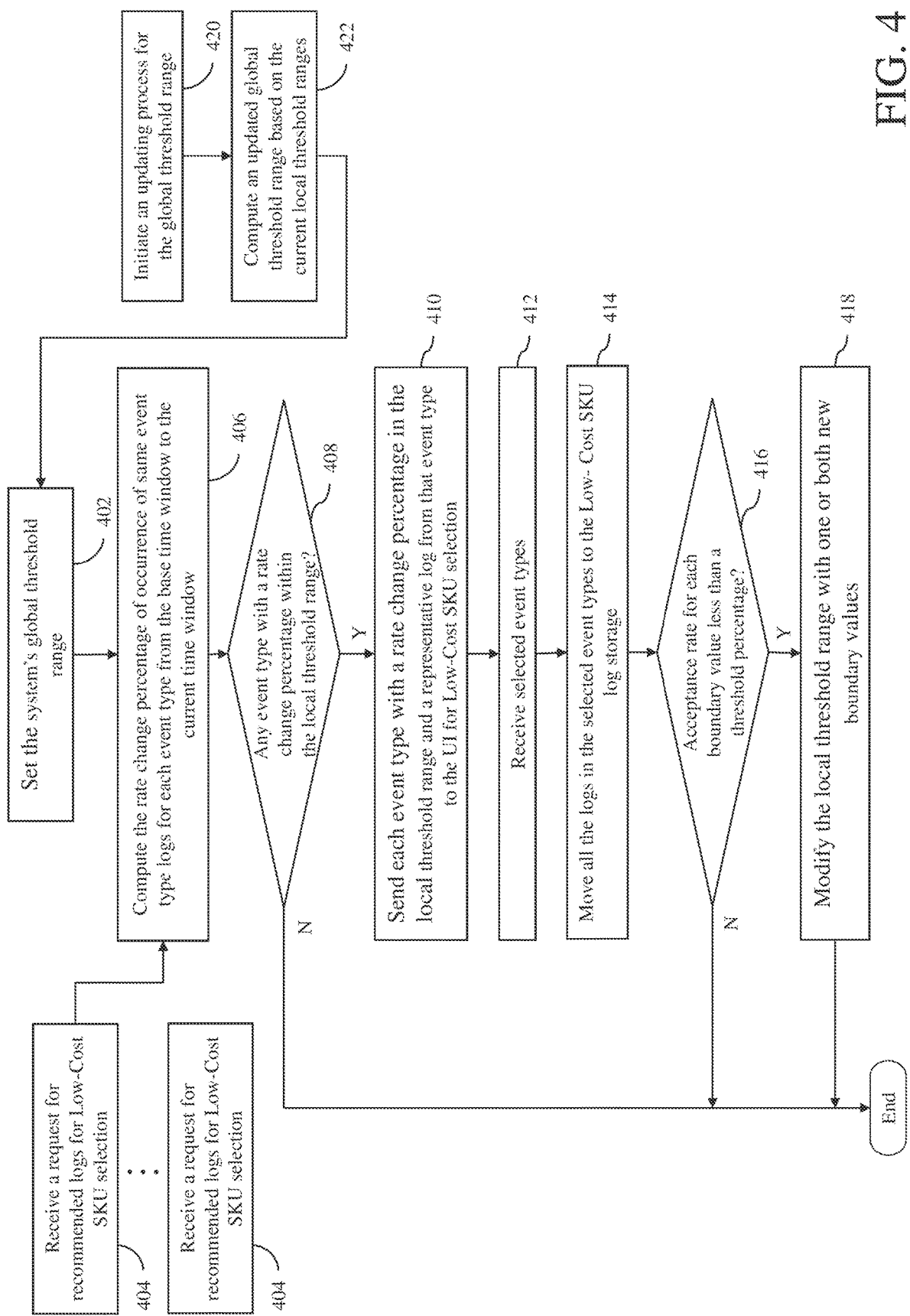
FIG. 4 is a process flow diagram of a log management operation of a log management service in the distributed system shown in FIG. 1 in accordance with an embodiment of the invention.

Turning now to FIG. 4, a process flow diagram of a log management operation of the log management service 102 in accordance with an embodiment of the invention is illustrated. As shown in block 402, the system's global threshold range is set with boundary values by the log manager 114. Initially, the global threshold range is set with default boundary values, e.g., −5% and +5%. Subsequently, the global threshold range may be set with new boundary values, as described below. As shown in each of blocks 404, a request for recommended logs for Low Cost SKU selection from a particular computing environment, e.g., one of the computing environments 104-108, is received by the log management service 102. In an embodiment, the request may be made by a user, e.g., an administrator of the particular computing environment, using the user interface of the log management service 102.

In response to one of the requests, at block 406, the rate change percentage of occurrence of same event type logs for each event type from the base time window to the current time window are computed by the log manager 114. In an embodiment, a log classification algorithm is used by the log manager 114 to group the logs in the base and current time windows into different event type clusters. For each event type cluster, change in the number of logs from the base time window to the current time window is computed as a change in the rate of occurrence of same event type logs from the base time window to the current time window. The rate of occurrence may be computed as occurrence of same event type logs per minute.

Next, at block 408, every event type is checked to determine whether the rate change percentage of any event type is within the local threshold range for the requesting computing environment. If no, then the process comes to an end. If yes, then the process proceeds to block 410.

At block 410, each event type with a rate change percentage within the local threshold range and a representative log from that event type are sent to the user interface for selection for the Low Cost SKU service. At block 412, selected event types are received by the log management service 102 in response to user selection. Next, at block 414, all the logs in the selected event types are moved to the Low Cost SKU log storage, i.e., the second tier log storage 112, by the log manager 114.

Next, at block 416, a determination is made whether the acceptance rate for each of the boundary values of the local threshold range is less than a threshold percentage, e.g., 60%. If no, then the process comes to an end. If yes, at block 418, the local threshold range is modified with one or both new boundary values depending on the acceptance rates at the boundary values with respect to the threshold percentage. If a current boundary value has an acceptance rate less than the threshold percentage, e.g., 60%, then that current boundary value is replaced with a new boundary value so that the local threshold range is shortened. Thus, depending on the acceptance rates of the two boundary values, one or both boundary values are modified to reduce the local threshold range. The process then comes to an end. Blocks 406-418 are executed for each of the requests for recommended logs for Low Cost SKU selection from the different computing environments.

At block 420, an updating process for the global threshold range is initiated. In an embodiment, this process is initiated every set time interval, e.g., every week. At block 422, based on the current local threshold ranges of the different computing environments, an updated global threshold range are computed. As an example, an average or median boundary values of the local threshold ranges for the different computing environments may be used to update the global threshold range. The updated global threshold range is then used to set the global threshold range, which is used as default local threshold range for any new systems that wants to use the log management service 102.

In another embodiment, at block 416, another determination may be made whether the acceptance rate for each of the boundary values of the local threshold range is greater than another less than another threshold percent, e.g., 90%. If yes, the local threshold range is modified with one or both new boundary values depending on the acceptance rates at the boundary values with respect to this second threshold percentage. If a current boundary value has an acceptance rate greater than the second threshold percentage, e.g., 90%, then that current boundary value is replaced with a new boundary value so that the local threshold range is lengthened, at block 420. Thus, depending on the acceptance rates of the two boundary values, one or both boundary values are modified to increase the local threshold range.

In an embodiment, the following algorithm may be used to extract logs for Low Cost SKU service.

---

Algorithm to extract logs for Low Cost SKU

---

Step 1: Generate two timeframes based on system's current time, i.e., current window, base window.
    Step 1.a: current_window_start_time ← variable to store current window start time
        current_window_start_time = system_current_time −
        6*60*60*100(milliseconds)
    Step 1.b: current_window_end_time ← variable to store current window end time
        current_window_end_time = system_current_time
    Step 1.c: base_window_start_time ← variable to store base window start time
        base_window_start_time = current_window_start_time −
        6*60*60*100(milliseconds)
    Step 1.d: base_window_end_time ← variable to store base window end time
        base_window_end_time = current_window_start_time
Step 2: Fetch total occurrence of each event_type for both windows.
    Step 2.a: curr_window_event_count_map ← Map<Pair<event_type, occurrence>>
        This is a map used to store count for every event_type on current window
        Use database query to fetch results −
    Select count(*), event_type from log where timestamp >= current_window_start_time
    and timestamp <= current_window_end_time group by event_type
    Step 2.b: base_window_event_count_map ← Map<Pair<event_type, occurrence>>
        This is a map used to store count for every event_type on base window
        Use database query to fetch results −
    Select count(*), event_type from log where timestamp >= base_window_start_time
    and timestamp <= base_window_end_time group by event_type
Step 3: Calculate change in rate of occurrence for every event_type from base window to current window in percentage.
    Step 3.a: event_type_rate_percentage_map ← Map<Pair<event_type, percentage> >
        This is a map stores percentage change in rate of occurrence for event_type
    Step 3.b: event_type_set ← current_window_event_count_map.getAllKey( )
        This is a map stores every event_type present in current window
        For each event_type ⊆ event_type_set begin
            base_event_rate ← base_window_event_count_map.get(event_type)/min
            curr_event_rate ← curr_window_event_count_map.get(event_type)/min $$\text{percentage\_change} \leftarrow \frac{(\text{base}_{event_{rate}} - curr_{event_{rate}})}{\text{base}_{event_{rate}}} * 100$$

store this percentage_change in event_type_rate_map as a value
        and key will be event_type for the same
    end for;

| Algorithm to extract logs for Low Cost SKU |
|---|
| Step 4: Fetch threshold limit (local threshold range) for a customer
    Step 4.a: customer_threshold_limit ← Threshold using which logs being extract out.
    Step 4.b: if requested customer is newly onboarded:
        customer _threshold limit = system's global threshold (global threshold range)
      else:
        customer threshold limit = customer's global threshold
      end if;
Step 5: For each event_type ⊆ event_type_rate_percentage_map begin
      If System check whether percentage rate is between customer_threshold_limit:
        Send log/event_type to UI
      end if;
    end for;
Step 6: Update system's and customer's threshold limits periodically in background
    Step 6.a: global_min_threshold, global_max_threshold ¬ system's global threshold limit
    Step 6.b: local_min threshold, local max threshold ¬ customer's local threshold limit
    Step 6.c: from UI, feedback loop receive data related to what all logs every customer selected and their respective event_type using which every customer acceptance rate will be calculated
    Step 6.d: create two threads, i.e., thread-0 use to run Step 6.e and thread-1 use to run Step 6.f
    Step 6.e: while true:
        If local_max_threshold acceptance rate > 60%:
          local_max_threshold++
        else:
          local_max_threshold --
        If local_min_threshold acceptance rate > 60%:
          local_min_threshold++
        else:
          local_min_threshold --
        store updated threshold values in DB
      end while;
    Step 6.f: calculate average of customer's local min and max threshold using DB and update global threshold with the same average value periodically every one week.
Step 7: End the algorithm. |

Figure 5:
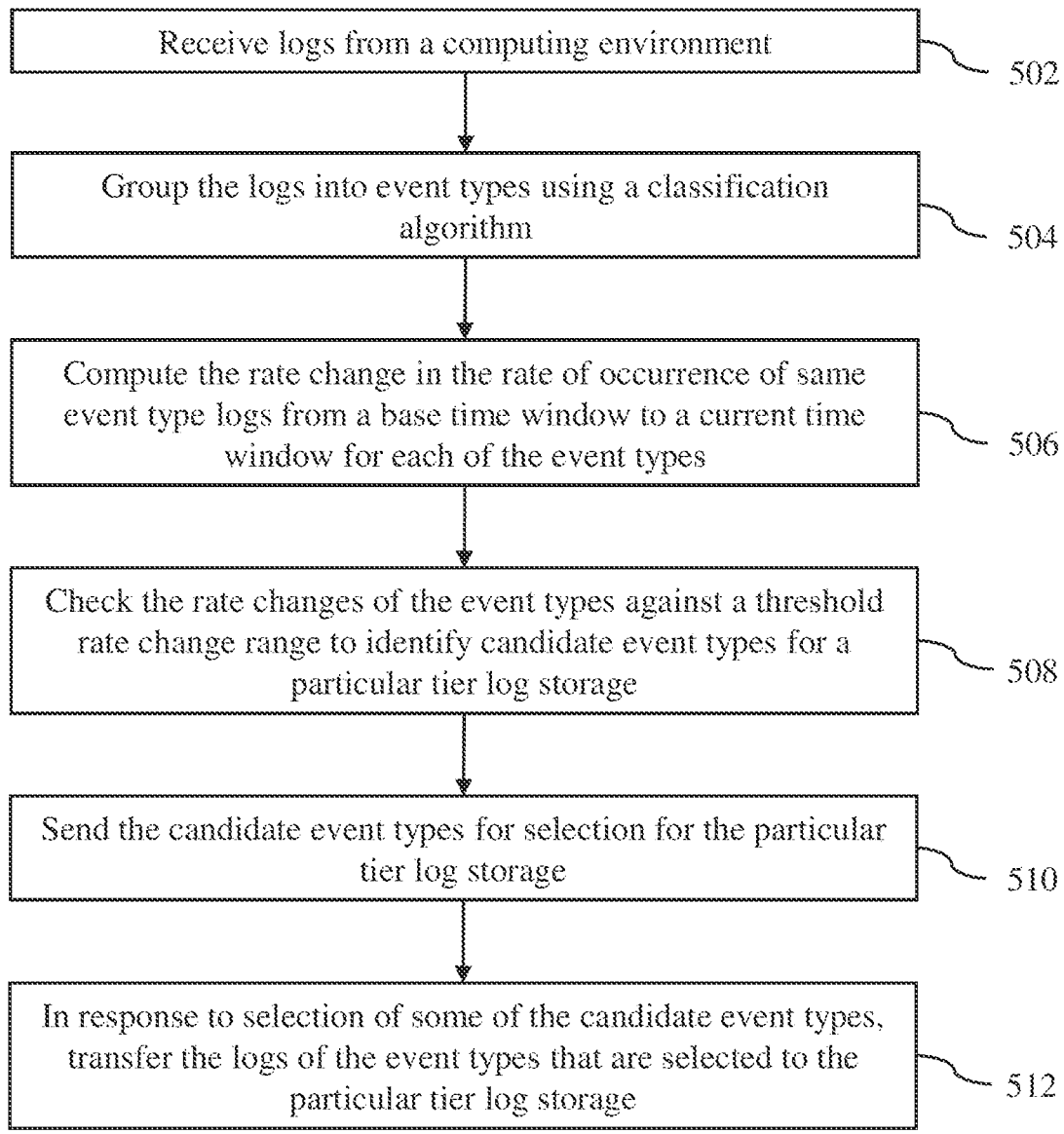
FIG. 5 is a flow diagram of a computer-implemented method managing logs from computing environments in accordance with an embodiment of the invention.

A computer-implemented method for managing logs from computing environments in accordance with an embodiment of the invention is described with reference to a flow diagram of FIG. 5. At block 502, logs are received from a computing environment. At block 504, the logs are grouped into event types using a log classification algorithm. At block 506, the rate change in the rate of occurrence of same event type logs from a base time window to a current time window is computed for each of the event types. At block 508, the rate changes of the event types are checked against a threshold rate change range to identify candidate event types for a particular tier log storage. At block 510, the candidate event types are sent for selection for the particular tier log storage. At block 512, in response to selection of some of the candidate event types, the logs in the candidate event types that are selected are transferred to the particular tier log storage.

The operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing logs from computing environments, the method comprising:
    receiving logs from a computing environment;
    grouping the logs into event types using a log classification algorithm;
    computing a rate change in a rate of occurrence of same event type logs from a base time window to a current time window for each of the event types;
    checking the rate changes of the event types against a threshold rate change range to identify candidate event types for a particular tier log storage;
    sending the candidate event types for selection for the particular tier log storage; and
    in response to selection of some of the candidate event types, transferring the logs in the candidate event types that are selected to the particular tier log storage.

2. The computer-implemented method of claim 1, further comprising modifying the threshold rate change range based on selection of the candidate event types.

3. The computer-implemented method of claim 2, wherein modifying the threshold rate change range includes changing a threshold value of the threshold rate change range when an acceptance rate of the candidate event types at the threshold value is less than an acceptance threshold.

4. The computer-implemented method of claim 3, wherein changing the threshold value of the threshold rate change range includes changing the threshold value of the threshold rate change range such that the threshold rate change range is shortened.

5. The computer-implemented method of claim 2, wherein modifying the threshold rate change range includes changing a threshold value of the threshold rate change range when an acceptance rate of the candidate event types at the threshold value is greater than an acceptance threshold.

6. The computer-implemented method of claim 5, wherein changing the threshold value of the threshold rate change range includes changing the threshold value of the threshold rate change range such that the threshold rate change range is lengthened.

7. The computer-implemented method of claim 1, wherein the threshold rate change range is a local threshold rate change range for the computing environment that is distinct from a global threshold rate change range, the global threshold rate change range being used as a default range for new computing environments for a log management service.

8. The computer-implemented method of claim 1, wherein the duration of the base time window equals the duration of the current time window and wherein the base time window precedes the current time window.

9. The computer-implemented method of claim 1, wherein sending the candidate event types includes sending a representative log from each of the candidate event types to a user interface for user selection.

10. A non-transitory computer-readable storage medium containing program instructions for managing logs from computing environments, wherein execution of the program instructions by one or more processors of a computer system causes the one or more processors to perform steps comprising:
    receiving logs from a computing environment;
    grouping the logs into event types using a log classification algorithm;
    computing a rate change in a rate of occurrence of same event type logs from a base time window to a current time window for each of the event types;
    checking the rate changes of the event types against a threshold rate change range to identify candidate event types for a particular tier log storage;
    sending the candidate event types for selection for the particular tier log storage; and
    in response to selection of some of the candidate event types, transferring the logs in the candidate event types that are selected to the particular tier log storage.

11. The computer-readable storage medium of claim 10, wherein the steps further comprise modifying the threshold rate change range based on selection of the candidate event types.

12. The computer-readable storage medium of claim 11, wherein modifying the threshold rate change range includes changing a threshold value of the threshold rate change range when an acceptance rate of the candidate event types at the threshold value is less than an acceptance threshold.

13. The computer-readable storage medium of claim 12, wherein changing the threshold value of the threshold rate change range includes changing the threshold value of the threshold rate change range such that the threshold rate change range is shortened.

14. The computer-readable storage medium of claim 11, wherein modifying the threshold rate change range includes changing a threshold value of the threshold rate change range when an acceptance rate of the candidate event types at the threshold value is greater than an acceptance threshold.

15. The computer-readable storage medium of claim 14, wherein changing the threshold value of the threshold rate change range includes changing the threshold value of the threshold rate change range such that the threshold rate change range is lengthened.

16. The computer-readable storage medium of claim 10, wherein the threshold rate change range is a local threshold rate change range for the computing environment that is distinct from a global threshold rate change range, the global threshold rate change range being used as a default range for new computing environments for a log management service.

17. The computer-readable storage medium of claim 10, wherein the duration of the base time window equals the duration of the current time window and wherein the base time window precedes the current time window.

18. The computer-readable storage medium of claim 10, wherein sending the candidate event types includes sending a representative log from each of the candidate event types to a user interface for user selection.

19. A system comprising:
    memory; and
    at least one processor configured to:
        receive logs from a computing environment;
        group the logs into event types using a log classification algorithm;
        compute a rate change in a rate of occurrence of same event type logs from a base time window to a current time window for each of the event types;
        check the rate changes of the event types against a threshold rate change range to identify candidate event types for a particular tier log storage;
        send the candidate event types for selection for the particular tier log storage; and in response to selection of some of the candidate event types, transfer the logs in the candidate event types that are selected to the particular tier log storage.

20. The system of claim 19, wherein the at least one processor is further configured to modify the threshold rate change range based on selection of the candidate event types.

\* \* \* \* \*